United States Patent
Momoitio

[11] Patent Number: 6,067,695
[45] Date of Patent: May 30, 2000

[54] DOUBLE ARM VERTICAL MILLER

[75] Inventor: Ignacio Alvarez Momoitio, Sopelana, Spain

[73] Assignee: Noran S.L., Vizcaya, Spain

[21] Appl. No.: 08/944,801

[22] Filed: Oct. 6, 1997

[30] Foreign Application Priority Data

Oct. 11, 1996 [ES] Spain ....................................... 9602151
Jul. 7, 1997 [ES] Spain ....................................... 9701509

[51] Int. Cl.[7] .................................................. B23Q 35/04
[52] U.S. Cl. ........................... 29/26 A; 409/99; 409/126; 409/202; 409/203
[58] Field of Search ................................ 409/98, 99, 107, 409/109, 126, 127, 133, 158, 159, 192, 191, 202, 203, 212, 213; 29/26 A

[56] References Cited

U.S. PATENT DOCUMENTS

| | | |
|---|---|---|
| 2,827,836 | 3/1958 | Horth et al. ................................ 409/99 |
| 3,296,932 | 1/1967 | Pankonin et al. ......................... 409/202 |
| 3,543,636 | 12/1970 | Tracy ....................................... 409/107 |
| 3,543,639 | 12/1970 | Hill ........................................... 409/99 |

FOREIGN PATENT DOCUMENTS

| | | | |
|---|---|---|---|
| 3112361 | 11/1982 | Germany | ................................ 409/126 |
| 3730622 | 3/1989 | Germany | ................................ 409/203 |
| 137860 | 10/1980 | Japan | ....................................... 409/98 |
| 157454 | 12/1980 | Japan | ....................................... 409/98 |
| 124551 | 7/1984 | Japan | ....................................... 409/98 |
| 76256 | 4/1986 | Japan | ....................................... 409/126 |
| 212448 | 9/1988 | Japan | ....................................... 409/98 |

*Primary Examiner*—Daniel W. Howell
*Attorney, Agent, or Firm*—Rodman & Rodman

[57] ABSTRACT

The miller comprises a pair of benches situated on both sides of a framework, in such a manner that on the upper crossbar is mounted, displaceable and guidable, a transverse support that carries a couple of vertical arms on which are mounted the corresponding tools, the arms being dispaceable towards one side or the other with respect to the support, while the tool that is borne by each of the arms may move upward/downward, as well as rotate, in such a manner that a combination of these movements produced by their corresponding motors allows simultaniously making two pieces that are symmetrical or the same, as well as effect simultanious digitalized work with one arm and milling with the other, after having mounted the corresponding tool on one arm and a digitalizer on the other.

15 Claims, 6 Drawing Sheets

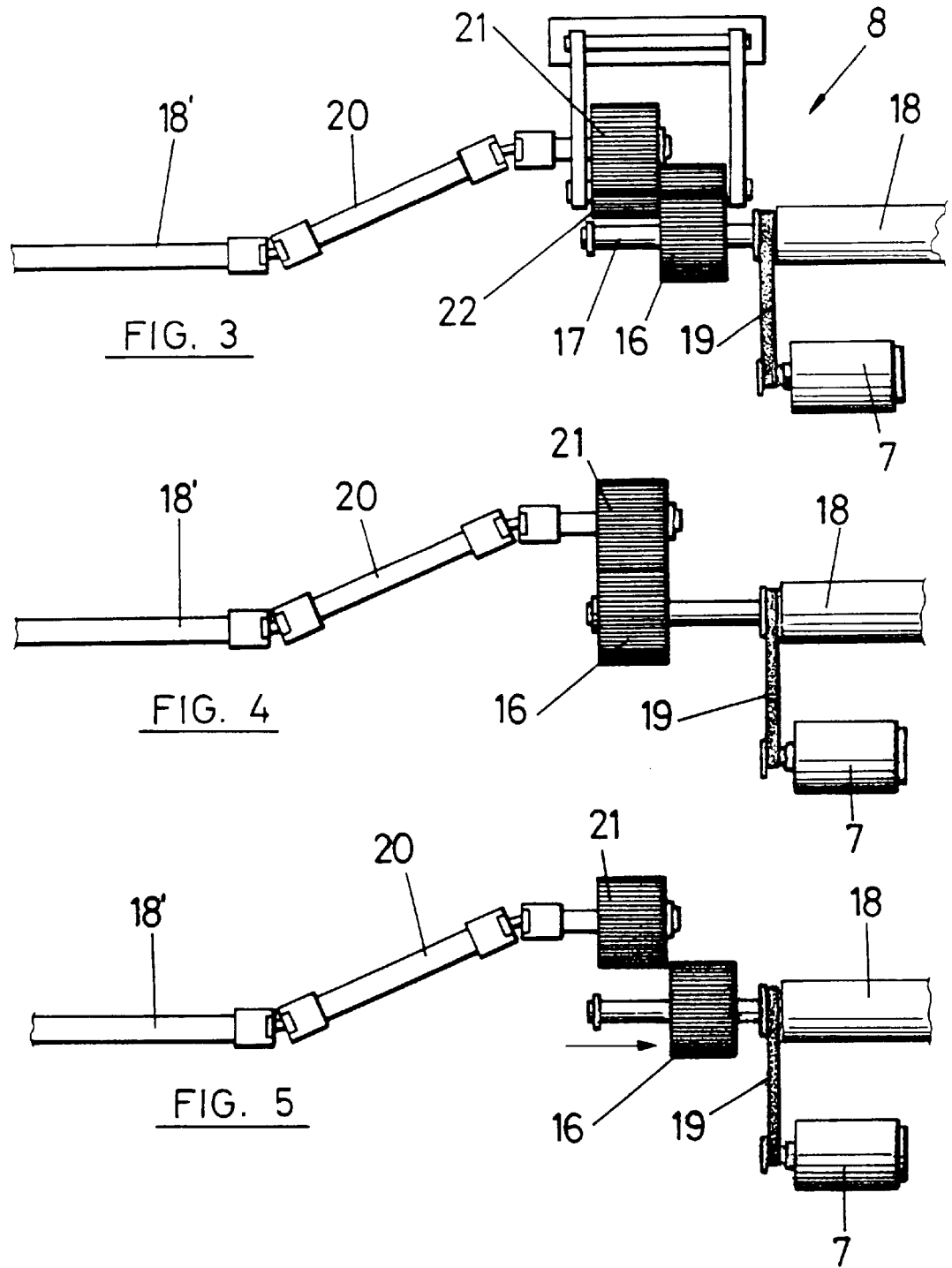

DOUBLE ARM VERTICAL MILLER

OBJECT OF THE INVENTION

The invention refers to a double arm vertical miller capable of performing three movements according to the rectangular coordinates, "X", "Y" and "Z", as well as a rotational movement of each one of the two mills fitted on their respective arms.

The miller may simultaneously execute two symmetric parts that are mirror images of each other or two identical parts, as well as simultaneously execute milling or digitizing.

BACKGROUND OF THE INVENTION

Normally milling machines include an arm on which the corresponding tool for picking up shavings is mounted, being complemented with a second arm acting as a test probe, such that in this type of machine it is impossible to simultaneously execute the milling of two parts.

There also exists a type of milling machine with two heads, described in the Spanish utility model, with application No. 8802993, which characterizes the fact that one of the heads is mounted on a main shaft, which may be displaced upwards/downwards with respect to the machine frame, whilst the other head is fitted on a mobile frame. The mobile frame is guided on the main shaft with the possibility of axial sliding, with respect to the main shaft and to the mentioned first head.

This present invention provides an embodiment that relates to a combination of two independent millers rather than to a double head miller, since its advantages are those of two independent machines and not those of a functionally double machine.

DESCRIPTION OF THE INVENTION

This vertical milling machine, has a double arm, that is, two arms fitted over the ends of a support, with respect to which they may be displaced in a "Y" movement, said support also being able to be displaced according to an "X" movement with respect to the upper crossbar corresponding to a bridge fixed over the corresponding table of lower work, with the particularity that the arms mentioned first of all are holders for the work tools, in this case, of the mills, which may be displaced upwards/downwards, according to the third movement "Z", as well as in a rotational direction, hence enabling two identical pieces to be machined, or even to carry out the machining of a piece by means of the tool fitted on one of the arms, and simultaneously to execute digitalizing by means of the corresponding digitalizer, fitted on the opposite arm.

The "X" movement of the upper support to the bridge will be made by means of a motor housed inside said support, preferably in correspondence with an area or intermediate point thereof, and which, for example, with a suitable reducer and pinion will work over a rack complementary to the corresponding guides which necessarily should incorporate the upper crossbar of the bridge to guide or displace this upper transverse support.

With respect to the "Y" movement of the respective vertical arms carrying the tools, or of a tool and the digitalizer, it will be done by means of a motor for each one of the arms, which arms are also fitted over guides in the respective transverse support. The motors for activating each arm will be located, for example, at each end of the transverse support. These motors are able to control movement of the respective arms in combination with, for example, associated screws and nuts Regarding the "Z" movement, that is, the vertical displacements of the tool, it is due to the fact that these are fitted with the capability of axial displacement on the vertical arms, that is, they may move longitudinally inside said arms, being activated by means of the corresponding motors located on the upper end of the vertical arms or by means of a motor located on the central part and a set of gears.

Moreover, each mill or tool should be equipped with its corresponding rotational movement for the execution of the cut, a movement that will be provided by another motor located on the coupling part of the tool to the arm.

Unquestionably, all the referred motors to carry out the different movements will be located or housed inside the respective arms or parts, such that the miller as a whole will be a simple machine and through the combination of these movements and structure, the following advantages result:

It may execute the simultaneous machining of two symmetrical parts or two identical parts, with the advantages of time saving and quality.

It may simultaneously execute the digitalization with one of the arms, and the machining or milling of one part, with the other, likewise improving time and quality.

The arrangement of the arms and the combination of movements which may provided to the former, allow milling of all types to be executed, such as models, molds, scale layouts, valves, matrices and aeronautics.

The movements of the different parts or components of the machine considerably reduce the space, at the same time that two parts may be executed or one part and the simultaneous digitalization, occupying a space which was that required or required with one conventional machine to execute the work with a single arm.

As a further option a single motor can be used for the movement of both of the vertical arms. The single motor is directly coupled to one of the shafts in the transverse support, that corresponding to one of the tools and a first gear. The first gear, by means of a clutch device, may be directly connected to a second gear, which is at the end of the other shaft of the miller. Or the first and second gear may be used with the cooperation of an intermediate gear, such that when the clutchable first gear is isolated, only one of the tools of the miller operates, to produce a single part. When the clutchable first gear connects directly with the second gear of the other shaft, both tools simultaneously operate, to produce two mirror image parts since the first and second gears rotate in opposite directions. When the clutchable first gear engages the second gear with the cooperation of a third idler gear, both shafts rotate in a same direction, to obtain equal parts.

If the mentioned support is desired, fitted transversely over the intermediate framework, it may be finished at its ends by two stanchions associated to the work bench by means of guides facilitating its displacement, when the mentioned support is slid along the framework, such that the support is materialized in a second framework, installed with a sliding nature, over the intermediate and fixed framework. With the latter, vibrations are prevented and the machine working conditions are improved.

Over one of the stanchions participating in the mobile framework, a viewer may be created to control work development.

The bench may be divided in two parts, on both sides of the intermediate and fixed framework, and if it is desired that each one of the two benches are no longer fixed, becoming mobile with the collaboration of some guides and runners supported over them. In this way, maintaining the bridge fixed, the benches may be separately mobilized to obtain the different parts.

According to another of the characteristics of the invention, the vertical stemples of the support for the tools, which, in turn, slides over the intermediate and fixed framework, become dismountable, allowing, reducing the support stability, the possibility of machining parts of any size.

Returning to the mobility of the benches again, under each one of them, a motor may be placed over a screw-nut set, such that while the ends of the screw are fixed to the ends of the bench, the nut is fixed to the intermediate module thereof, hence becoming displaceable in one or other direction on rotating the said motor also in one or other direction.

According to another of the characteristics of the invention, the incorporation to the machine of fixed supports has been foreseen, in which a protractile boss acts, such that by means of bosses of said supports, the benches may be blocked, one at a time or simultaneously, specifically when two identical or mirror-image parts are being executed.

Finally, and according to another of the characteristics of the invention, the existence of a mobile support has also been foreseen with a fixed boss, entrusted with blocking the machine support, immobilizing it with respect to the bridge thereof, in turn, fixed, when necessary. This allows, for example, leaving one of the benches mobile and coupling a market turn-table to the other, at the appropriate distance, machining a crown of infinite external radius and internal radius depending on the width of the bench, it being possible to simultaneously execute another equal or different part by means of the other arm.

DESCRIPTION OF THE DRAWINGS

To complement the description being made and with the purpose of understanding the characteristics of the invention better, a set of drawings which with an illustrative and non-limiting character is attached to this descriptive report as an integral part thereof, consist of the following:

FIGS. 3, 4 and 5 show front views of the set of gears shown in FIG. 3 in positions: to obtain two identical parts, to obtain two mirror image parts and the milling of a single part, respectively.

PREFERRED EMBODIMENT OF THE INVENTION

Figure 1:
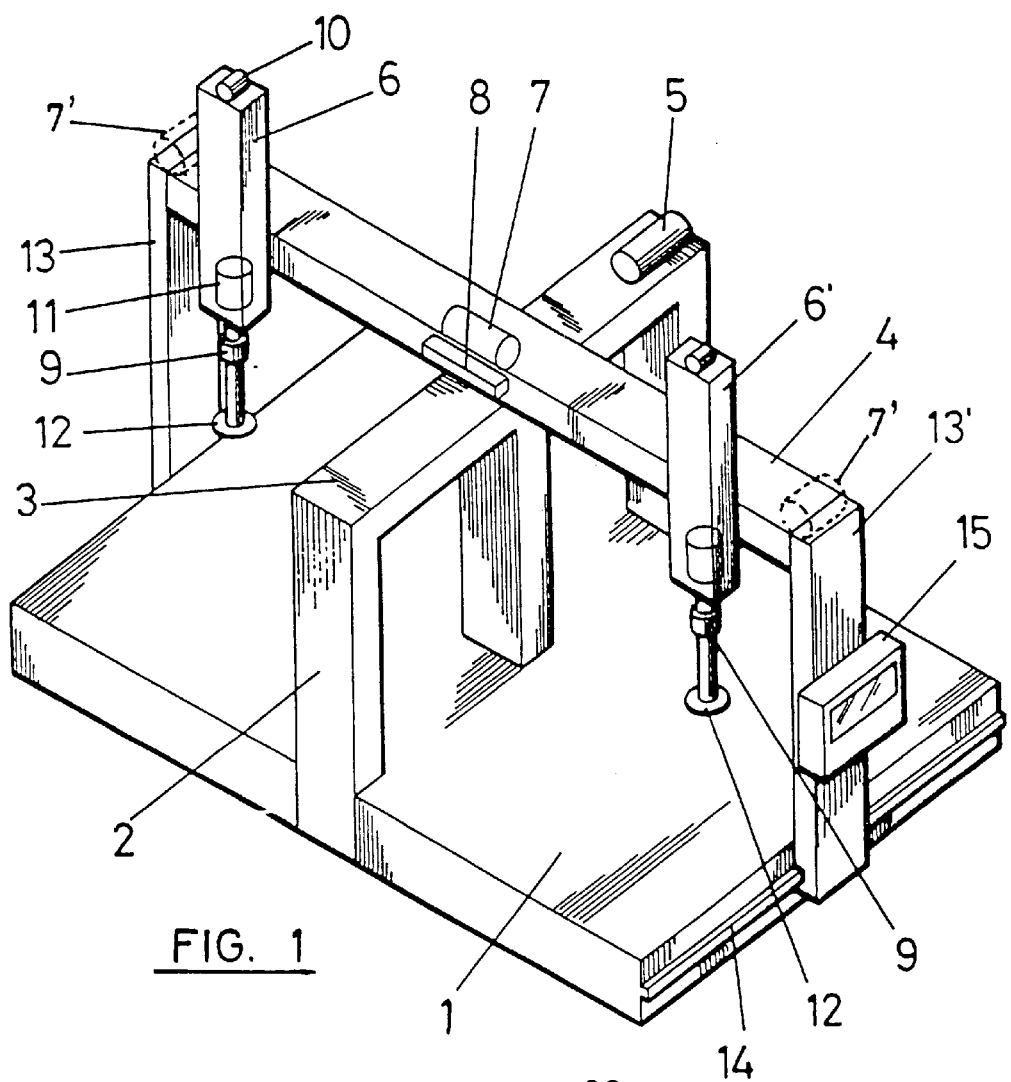
FIG. 1 shows a schematic perspective view of one version of a double arm miller executed according to the principles of the invention.

Viewing FIG. 1, it may be observed how the vertical miller shown incorporates a platform or work bench (1) on which is fitted transversely and in the center a fixed framework (2), which defines in its upper part a guide (3) for sliding movement of a support (4) along an "X" axis such movement being powered by a motor component (5). Respective end arms (6–6'), slide over guides of the support (4) respectively powered by two end motors (7') or by an intermediate, single motor (7) by means of a set of gears (8), that will be described below, to obtain movement along a "Y" axis. Movement along the "Z" axis is obtained thanks to the tool holder heads (9), which are displaceable vertically inside said arms (6–6'), power by respective motors (10), and (11), inside the arms (6–6'), which motor also confer the tools (12) with the necessary rotational movement so that they may carry out their milling function. These tools are normally mills, but in a given case may be a digitalizer.

The support (4), at its opposite ends is interlocked to two stanchions (13–13'). The stanchions (13–13') are provided at their lower end with means for coupling to the guides (14) at the margins and corresponding to the work bench (1). Thus the support (4) is a mobile framework offering a greater stability to the combination, absorbing vibrations and permitting a faster work rhythm. In turn, either of these stanchions (13) serves as a support for a viewer (15), allowing the development of the work being executed to be controlled.

Figure 2:
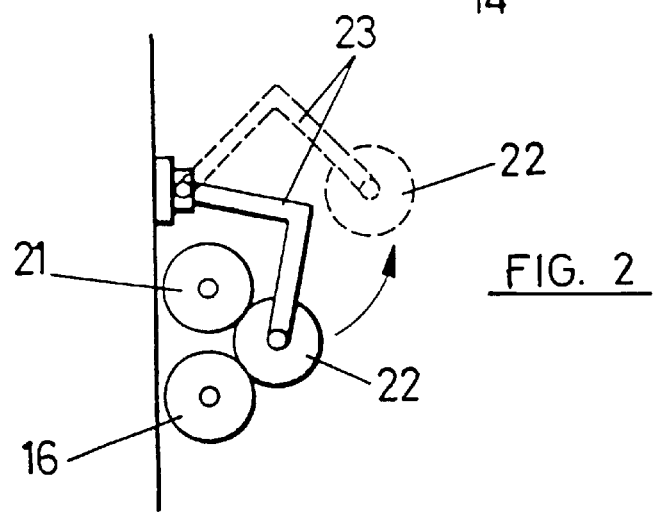
FIG. 2 shows a schematic profile view, of the set of gears indicated by reference 8 in FIG. 2.

Returning once again to the set of gears (8) and as may be especially observed in FIGS. 2 and 3, this consists of a main gear (16) which can slide over an extension (17) of the shaft (18) corresponding to one of the two halves of the support (4). The shaft 18 is powered by the motor (7), by means of the belt (19) or any other means of suitable transmission, such that this shaft (18) is kept in movement provided the motor (7) is running.

The other shaft (18'), corresponding to the other half of the support (4) after a loaded transmission (20), terminates in a second gear (21) identical to the gear (16). The gear 16 is laterally dephased with respect to it, until a situation requires that the gears (16) and (21) engage. It is thus possible to engage and disengage gears 16 and 21 by of sliding the main gear (16) over the extension (17) of the shaft (18), between the extreme positions in FIGS. 4 and 5.

Specifically, in the engaged position shown in FIG. 4 for the gears (16) and (21), the movement is transmitted to the secondary shaft (18'), in a direction opposite to that of the main shaft (18), hence obtaining the simultaneous machining of two mirror-image parts. In the position shown in FIG. 5, in which the gears (16) and (21) are disengaged, only the main shaft (18) moves, a work position corresponding to obtaining a single part.

In order and to simultaneously obtain two equal parts, the movements of the shafts (18) and (18') should be in the same direction. A idler third gear (22) is provided has on a walking beam (23), which beam (23) may be activated by any suitable device between the limit positions shown in a continuous and discontinuous plot in FIG. 2. Thus when a machining operation does not require engagement of the gear (2) it is held in the position shown in dotted outline in FIG. 2. Third gear (22) may be coupled to the gears (16) and (21), as an idler gear, according to the representation in FIG. 3, when said gears (16) and (21) are longitudinally disengaged, by which the intended transmission of movement is obtained from the main shaft (18) to the secondary shaft (18'), with movement in a same direction, to obtain equal parts.

Figure 6:
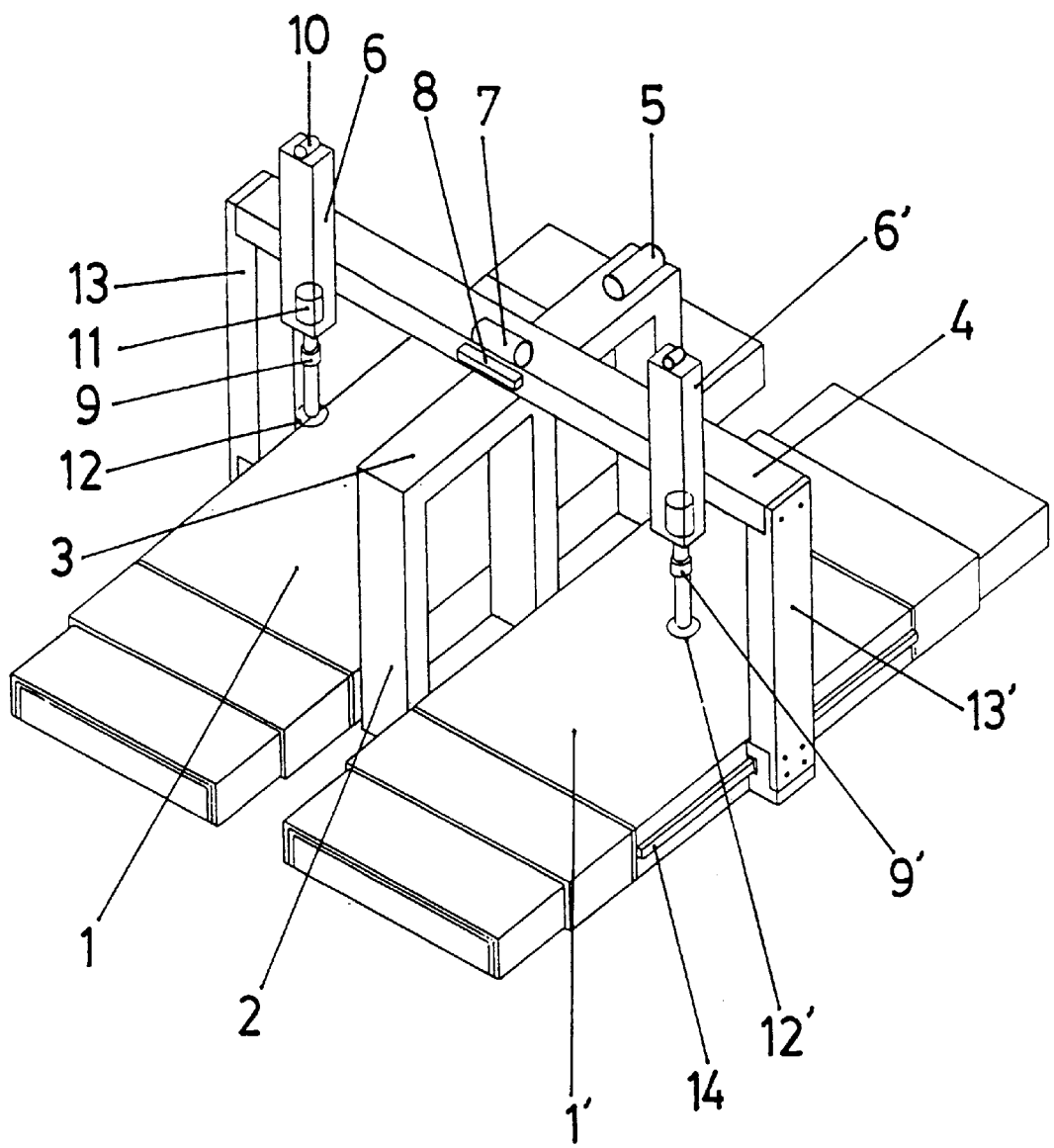
FIG. 6 shows a similar view to that in FIG. 1, where the miller shows some modifications.

In FIG. 6, a similar view to that of FIG. 1 is shown, but with the novelty that the bench has been divided into two, with reference numbers (1) and (1'), respectively. The components shown for one bench or the other have the same references as those shown in FIG. 1, with the difference that the reference numbers belonging to bench (1') are primed.

Figure 7:
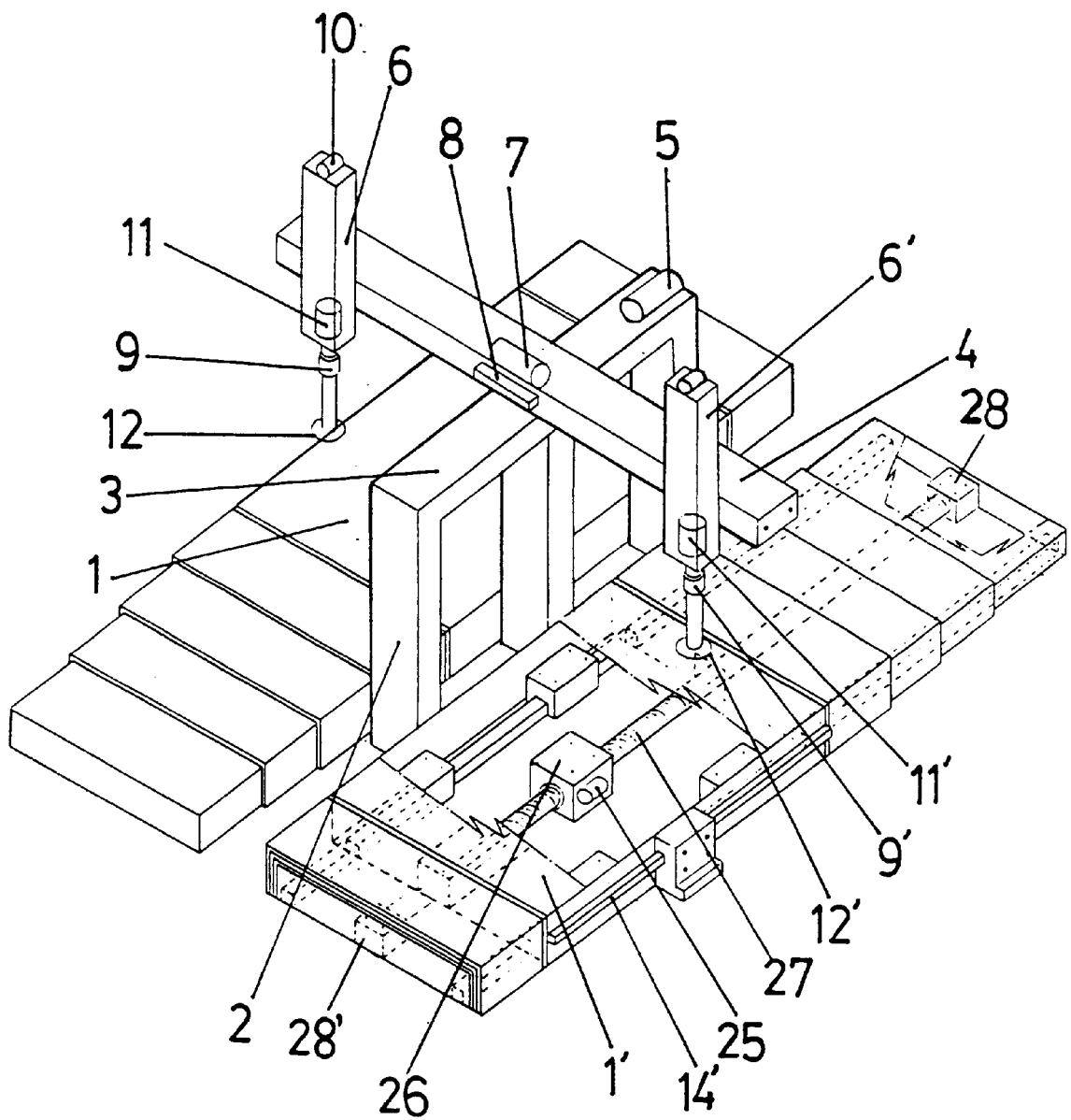
FIG. 7 shows a similar view to that in FIG. 6, where the two benches are partially sectioned showing part of their activation mechanism.
Figure 8:
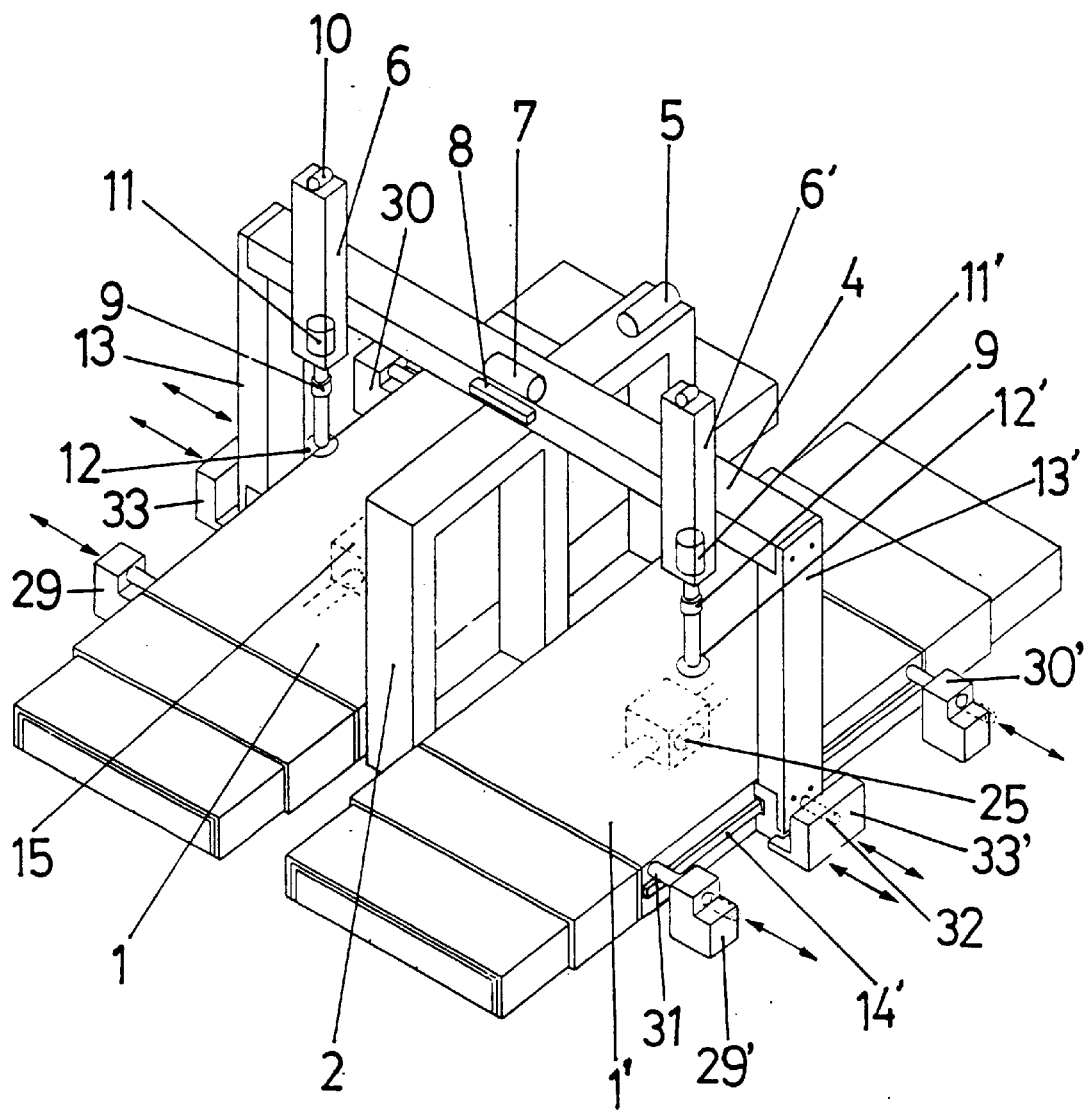
FIG. 8 is a view of the miller in FIG. 6, where the holding supports have been incorporated for the immobilizing bosses of the benches and the supports for coupling to the miller of a turn-table.

In FIG. 7, it may be seen that one of both of the stanchions (13–13') can be bypassed to avoid having them before with the purpose of an obstacle in some cases. For this purpose, the mentioned stanchions (13–13') can be rendered non-movable with the support (4), it then being possible to bypass them if the dimensions of the part to be machined so require (FIG. 7).

Regarding FIGS. 6 and 7, it may be observed that the benches (1–1') may be longitudinally non-movable, the end portion of the benches remains immobile. The benches (1–1') are structured of numerous telescopic and hollow modules, inside of which is a motor (25), which acts over a nut (26), fixed to the intermediate module of the corresponding bench (1–1'), acting over a screw (27) between end bearings (28–28'), fixed to the ends of the bench, as may be especially observed in FIG. 7. In this way, the operative sectors of the benches (1–1') may remain perfectly opposite to each other, as in the case of FIG. 6, when identical parts have to be machined, or may remain arranged in diametric opposition, as shown in FIG. 7, when symmetrical parts have to be prepared or they may adopt any other relative position when different parts have to be executed simultaneously.

Anyway, the benches (1–1') may be fixed with the help of fixed supports (29–29', 30–30') provided with a protractable shank (31) which may be housed in holes made in the corresponding edges of the benches (1–1').

Figure 9:
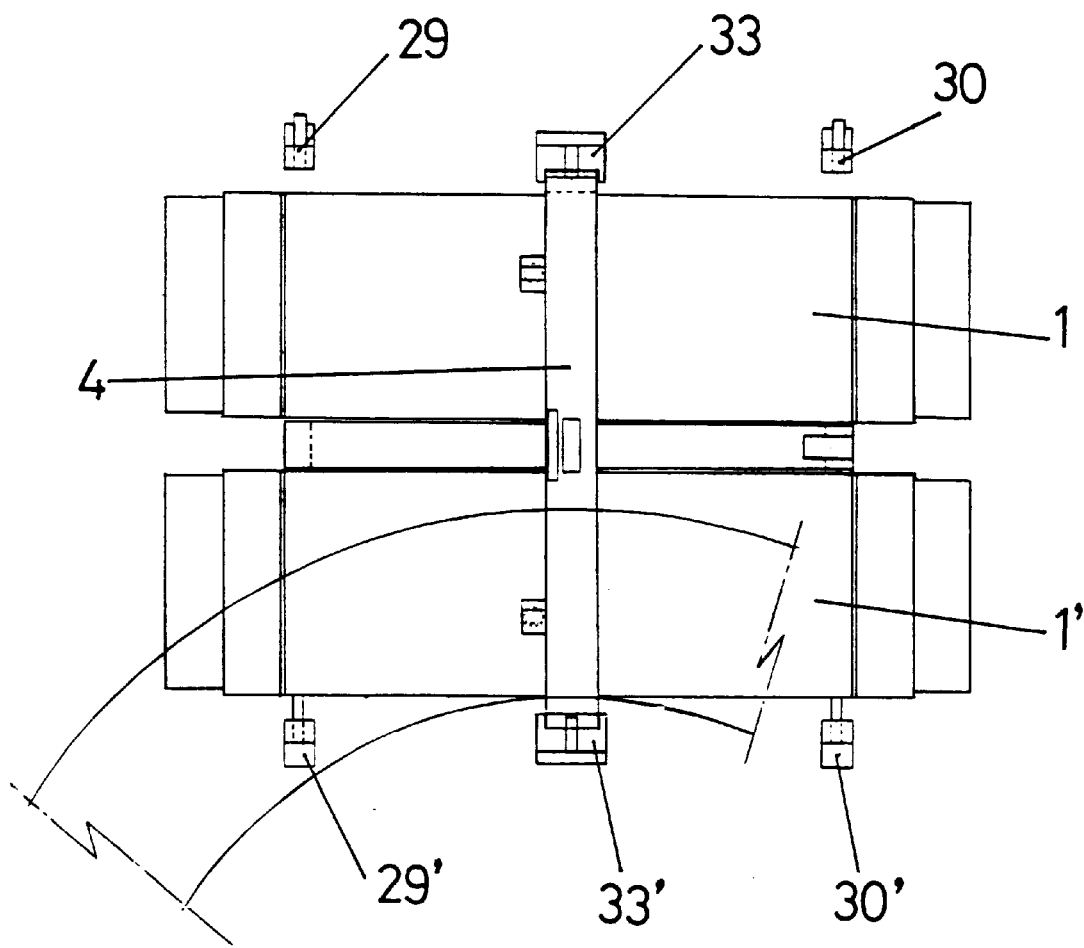
FIG. 9 schematically shows a plan view of the miller in FIG. 8 to which a turn-table has been coupled.

Moreover, at the lower end of the vertical stemples (13–13'), a fixed boss (32) is interlocked, such that to the two side bosses, two fixed supports (33–33') are coupled which permit, with the help of two turn-tables (34), consisting of market components and located at a suitable distance, as may observed in FIG. 9, to machine crowns of up to an infinite external radius and an internal radius depending on the width of the bench, as already has been said, it being possible to machine two crowns simultaneously, one on each side of the machine, or only one of said crowns and on the other side a part of any shape.

I claim:

1. A double arm vertical miller for machining two mirror-image articles or two identical articles, or for simultaneously performing a machining operation and a digitalizing operation, comprising
    a) a bench,
    b) a vertical frame extending upwardly from a mid-portion of said bench to divide the bench into two bench portions,
    c) said vertical frame including an upper horizontal cross bar guide having opposite end portions,
    d) a transverse support extending transversely of said cross bar guide and slideable on said cross bar guide from one of said opposite end portions to the other said opposite end portion and vice versa in directions parallel to an "X" coordinate,
    e) a pair of spaced vertical arms slideably mounted to said transverse support above a respective said bench portion for back and forth movement in directions parallel to a "Y" coordinate,
    f) a tool member mounted to each of said vertical arms for movement with the respective said vertical arms,
    g) means on each of said vertical arms for displacing respective said tools downwardly or upwardly toward or away from said bench portions in directions parallel to a "Z" coordinate,
    h) and means for rotating said tools
        (i) in the same direction to provide identical machined articles, or
        (ii) in opposite directions to provide mirror-image articles, or
        (iii) to permit rotation of one of said tools without rotating the other said tool to provide one machined article.

2. The miller as claimed in claim 1 wherein one of said tools is interchangeable with a digitalizer to permit a milling operation with one of said vertical arms and a digitalizing operation with the other said vertical arm.

3. The miller as claimed in claim 1 wherein said bench portions are constructed as two separate benches and said vertical frame is located between said separate benches.

4. The miller as claimed in claim 3 wherein one of said tools is interchangeable with a digitalizer to permit a milling operation with one of said vertical arms and a digitalizing operation with the other said vertical arm.

5. The miller as claimed in claim 1 including a first motor on said horizontal cross bar guide cooperable with said transverse support to move said transverse support back and forth in directions parallel to said "X" coordinate, a second and third motor at opposite ends of said transverse support, said second and third motors being respectively cooperable with said vertical arms to move said vertical arms back and forth in directions parallel to said "Y" coordinate, and fourth and fifth motors respectively located at an upper end of each of said vertical arms for moving the respective tools in the respective vertical arms upwardly or downwardly in directions parallel to said "Z" coordinate and, sixth and seventh motors respectively located in each of said vertical arms for rotating the respective tools in the respective vertical arms.

6. The miller as claimed in claim 2 including a first motor on said horizontal cross bar guide cooperable with said transverse support to move said transverse support back and forth in directions parallel to said "X" coordinate, a second and third motor at opposite ends of said transverse support, said second and third motors being respectively cooperable with said vertical arms to move said vertical arms back and forth in directions parallel to said "Y" coordinate, and fourth and fifth motors respectively located at an upper end of each of said vertical arms for moving the respective tool and digitalizer in the resepective vertical arms upward or downwardly in directions parallel to said "Z" coordinate and, sixth and seventh motors respectively located in each of said vertical arms for rotating the respective tool in one said vertical arm and for operating the digitalizer in the other said vertical arm.

7. The miller as claimed in claim 1 including
    a) a single motor on said transverse support intermediate the opposite ends of the transverse support,
    b) a first axially rotatable transmission shaft cooperable with one of said vertical arms to move said one vertical arm back and forth in directions parallel to the "X" coordinate,
    c) a gear system including a first gear joined to said first transmission shaft,
    d) said single motor rotating said first transmission shaft and said first gear,
    e) a second transmission shaft cooperable with the other said vertical arm,
    f) said gear system including a second gear joined to said second transmission shaft, g) said first gear being displaceable on said first transmission shaft for selective engagement and disengagement with said second gear, h) and wherein engagement between said first and second gears causes rotational movement of said first and second transmission shafts in opposite directions to cause movement of said vertical arms in opposite directions parallel to the "X" coordinate toward or away from each other.

8. The miller as claimed in claim 7 wherein said gear system includes a third gear on a walking beam for moving said third gear into or out of engagement with said first and second gears as an idler gear, said third gear being engageable with said first and second gears as an idler gear when said first and second gears are disengaged from each other, whereby said first and second gears, when in engagement with said idler gear rotate in the same direction thereby causing the movement of the vertical arms in the same direction parallel to the "X" coordinate.

9. The miller as claimed in claim 1 wherein said bench has opposite edge portions and said transverse support has opposite ends corresponding to the opposite edge portions, and a vertical stanchion is joined to each said opposite end of said transverse support, said stanchions each having a lower end confronting the respective said opposite edge portions of said bench, and engageable guide means are provided at the lower end of said stanchions and at the opposite edge portions of said bench to permit slideable back and forth movement of said stanchions together with said transverse support in directions parallel to the "X" coordinate whereby the engagement between the stanchions and the opposite edge portions of the bench serve to prevent vibrations that might be generated by operating components of the miller.

10. The miller as claimed in claim 4 wherein each of said two separate benches has an opposite outside edge portion away from said vertical frame, and said transverse support has opposite ends corresponding to the opposite edge portions, and a vertical stanchion is joined to each said opposite end of said transverse support, said stanchions each having a lower end confronting the respective said opposite edge portions of said separate benches, and engageable guide means are provided at the lower end of said stanchions and at the opposite edge portions of said separate benches to permit slideable back and forth movement of said stanchions together with said transverse support in directions parallel to the "X" coordinate whereby the engagement between the stanchions and the opposite edge portions of the bench serve to prevent vibrations that might be generated by operating components of the miller.

11. The miller as claimed in claim 9 wherein at least one of the vertical stanchions support a viewer of articles operated on by said miller.

12. The miller as claimed in claim 10 wherein at least one of the vertical stanchions support a viewer of articles operated on by said miller.

13. The miller as claimed in claim 10 wherein each of said separate benches has fixed forward and rearward free ends and each of said benches comprises a plurality of hollow telescopic modules, including an outermost module of each said bench disposed intermediate the fixed forward and rearward free ends of each said bench and inner telescoping modules disposed between the outermost module and the respective free ends of each said bench, an elongated rotateable screw being disposed inside the hollow telescopic modules of each said bench and having opposite ends held captive at the respective forward and rearward free ends of each of said benches, a nut in each said bench engageable with the screw in each said bench and fixed to the outermost module of each said bench and an actuation motor on each said nut to rotate each said screw in two directions to move the nut and the corresponding outermost module of each said bench forwardly or rearwardly to compress or extend the telescoping modules of each said bench that are provided between the outermost module and the respective forward and rearward free ends of each of said bench.

14. The miller as claimed in claims 13 wherein a pair of fixed supports are provided at respective outside edge portions of the two benches, and the opposite outside edge portions include a plurality of spaced openings, a protractable projection being provided in each said fixed support for selective engagement in a respective opening at the opposite outside edge portions of said benches for optional blocking of movement of the hollow telescopic modules of said benches.

15. The miller as claimed in claim 10 wherein said stanchions are detachably joined to each said opposite end of said transverse support and wherein a fixed support is provided at the respective opposite outside edge portions of the two benches at the lower end of each of said stanchions, and the lower end of each of said stanchions include an opening, and a protractable projection is provided in each of said fixed supports for selective engagement in the opening at the lower end of each of said stanchions for optional blocking of the movement of said stanchions with said transverse support when said transverse support is disengaged from said stanchions, to permit said transverse support to bypass said stanchions when an article to be machined is wider than the width of said benches.

* * * * *